(12) United States Patent
Mentovich et al.

(10) Patent No.: US 11,791,903 B2
(45) Date of Patent: Oct. 17, 2023

(54) CONSOLIDATING MULTIPLE ELECTRICAL DATA SIGNALS INTO AN OPTICAL DATA SIGNAL ON A MULTI-CHIP MODULE USING ASIC FOR CONTROLLING A PHOTONICS TRANSCEIVER

(71) Applicant: MELLANOX TECHNOLOGIES, LTD., Yokneam (IL)

(72) Inventors: Elad Mentovich, Tel Aviv (IL); Dimitrios Kalavrouziotis, Papagou (GR); Paraskevas Bakopoulos, Ilion (GR); Eyal Waldman, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 171 days.

(21) Appl. No.: 17/608,170

(22) PCT Filed: May 13, 2019

(86) PCT No.: PCT/GR2019/000034
§ 371 (c)(1),
(2) Date: Nov. 2, 2021

(87) PCT Pub. No.: WO2020/229849
PCT Pub. Date: Nov. 19, 2020

(65) Prior Publication Data
US 2022/0216919 A1 Jul. 7, 2022

(51) Int. Cl.
*H04B 10/524* (2013.01)
*G02F 1/21* (2006.01)
*G02F 1/225* (2006.01)

(52) U.S. Cl.
CPC .......... *H04B 10/524* (2013.01); *G02F 1/212* (2021.01); *G02F 1/225* (2013.01)

(58) Field of Classification Search
CPC ........ H04B 10/524; G02F 1/212; G02F 1/225
(Continued)

(56) References Cited

U.S. PATENT DOCUMENTS

| | | | |
|---|---|---|---|
| 6,341,031 B1 | 1/2002 | McBrien et al. | |
| 8,346,087 B2* | 1/2013 | O'Krafka | G02B 6/43 398/43 |

(Continued)

FOREIGN PATENT DOCUMENTS

WO 2021094790 A1 5/2021

OTHER PUBLICATIONS

Shubin et al., "Microring-based Multi-chip WDM Photonic Module," Optics Express, vol. 23, issue 10, pages pp. 1-14, May 18, 2015.
(Continued)

*Primary Examiner* — Dalzid E Singh
(74) *Attorney, Agent, or Firm* — KLIGLER & ASSOCIATES PATENT ATTORNEYS LTD (57) ABSTRACT

A multi-chip module (MCM-10) includes a substrate (11), one or more photonic chips (14) disposed on the substrate, and an electronic chip (12) disposed on the substrate. The one or more photonic chips include one or more optical channels (22), which are configured to guide propagating optical signals, and two or more photonic modulator-segments (18) coupled to each of the optical channels, each photonic modulator-segment configured to modulate the propagating optical signals responsively to digitally modulated driving electrical signals provided thereto. The electronic chip is configured to generate the digitally modulated driving electrical signals on multiple different lanes (16) of the electronic chip, synchronize the driving electrical signals on the multiple lanes to a same clock, separately control respective phases of the driving electrical signals, fine-tune
(Continued)

the voltages of the driving electrical signals on the multiple lanes, and drive the photonic modulator-segments on the photonic chips with the synchronized and phase-controlled driving electrical signals.

19 Claims, 3 Drawing Sheets

(58) Field of Classification Search
USPC .......................................................... 398/189
See application file for complete search history.

(56) References Cited

U.S. PATENT DOCUMENTS

| | | | |
|---|---|---|---|
| 8,676,060 | B2 | 3/2014 | Kawanishi et al. |
| 9,225,422 | B1 | 12/2015 | Nagarajan |
| 9,467,231 | B2 | 10/2016 | Bhoja et al. |
| 9,553,673 | B1 | 1/2017 | Nagarajan et al. |
| 9,838,239 | B2 | 12/2017 | Chen et al. |
| 9,964,719 | B1 | 5/2018 | Razdan et al. |
| 2003/0007210 | A1 | 1/2003 | Kenny |
| 2004/0004268 | A1 | 1/2004 | Brown et al. |
| 2007/0212076 | A1* | 9/2007 | Roberts ............... H04B 10/5053 398/183 |
| 2009/0041473 | A1* | 2/2009 | Nishihara ........... H04B 10/5051 398/188 |
| 2009/0278244 | A1 | 11/2009 | Dunne et al. |
| 2010/0129072 | A1 | 5/2010 | Yoshiuchi et al. |
| 2012/0216084 | A1 | 8/2012 | Chun et al. |
| 2013/0084065 | A1 | 4/2013 | Ishii |
| 2013/0101296 | A1 | 4/2013 | Nishimoto |
| 2014/0153075 | A1 | 6/2014 | Malacame et al. |
| 2015/0331262 | A1 | 11/2015 | Noguchi et al. |
| 2017/0199328 | A1 | 7/2017 | Shubin et al. |
| 2018/0196196 | A1 | 7/2018 | Byrd et al. |
| 2018/0306991 | A1 | 10/2018 | Epitaux et al. |
| 2019/0229810 | A1* | 7/2019 | Hayashi ............... H04B 10/073 |
| 2019/0324298 | A1* | 10/2019 | Dayel ...................... H03F 3/087 |

OTHER PUBLICATIONS

Krishnamoorthy et al., "From Chip to Cloud: Optical Interconnects in Engineered Systems," Journal of Lightwave Technology, vol. 35, issue 15, pp. 1-14, year 2017.

Atabaki et al., "Integrating Photonics with Silicon Nanoelectronics for the Next Generation of Systems on a Chip," Nature, vol. 556, p. 1-33, Apr. 18, 2018.

Akhter et al., "WaveLight: A Monolithic Low Latency Silicon-Photonics Communication Platform for the Next-Generation Disaggregated Cloud Data Centers," 2017 IEEE 25th Annual symposium on High-Performance Interconnects (HOT), pp. 25-28, year 2017.

Oz Optics, "Directional Fiber Optic Power Monitors (Taps/Photodiodes)", Product Information, Ottawa, Canada, pp. 1-5, Feb. 23, 2018.

Wolf et al., "Coherent Modulation up to 100 GBd 16QAM Using Silicon-Organic Hybrid (SOH)", Optics Express, vol. 26, No. 1, pp. 220-232, Jan. 8, 2018.

Audzevich et al., "Power Optimized Transceivers for Future Switched Networks," IEEE Transactions on Very Large Scale Integration (VLSI) Systems, vol. 22, No. 10, pp. 2081-2092, Oct. 1, 2014.

International Application # PCT/GR2019/000034 Search Report dated Feb. 12, 2020.

International Application # PCT/GR2019/000080 Search Report dated Aug. 3, 2020.

U.S. Appl. No. 17/764,540 Office Action dated Feb. 9, 2023.

* cited by examiner

CONSOLIDATING MULTIPLE ELECTRICAL DATA SIGNALS INTO AN OPTICAL DATA SIGNAL ON A MULTI-CHIP MODULE USING ASIC FOR CONTROLLING A PHOTONICS TRANSCEIVER

FIELD OF THE INVENTION

The present invention relates generally to communications, and particularly to apparatuses for transmitting and receiving optical and/or electrical signals at high rates and manufacturing methods of such apparatuses.

BACKGROUND OF THE INVENTION

Circuitries for driving and controlling photonic signals were previously described in the patent literature. For example, U.S. Pat. No. 9,225,422 describes an integrated system-on-chip device that is configured on a single silicon substrate member. The device includes an input/output (I/O) block, a data I/O interface, a signal processing block, and a driver module. The I/O block is coupled to the data I/O interface. The signal processing block is coupled to the I/O block. The driver module is coupled to the signal processing block. In an example, the device has a driver interface, provided on the substrate member, which is coupled to the driver module and configured to be coupled to a silicon photonics device. The control block is configured to receive and send instructions in a digital format to the communication block and is configured to receive and send signals in an analog format to communicate with the silicon photonics device. In an embodiment, the driver interface is configured to transmit output data in either an amplitude modulation format or a combination of phase/amplitude modulation format or a phase modulation format.

As another example, U.S. Patent Application Publication 2018/0196196 describes co-packaging of ASIC and silicon photonics. A module includes an electronic integrated circuit and a plurality of photonic integrated circuits, connected to the electronic integrated circuit by wire bonds or by wire bonds and other conductors. A metal cover of the module is in thermal contact with the electronic integrated circuit and facilitates extraction of heat from the electronic integrated circuit. Arrays of optical fibers are connected to the photonic integrated circuits.

U.S. Patent Application Publication 2018/0306991 describes an optical module that includes a waveguide interconnect that transports light signals, a Silicon Photonics chip that modulates the light signals, detects the light signals, or both modulates and detects the light signals, a coupler chip attached to the Silicon Photonics chip, and the waveguide interconnect so that the light signals are transported along a light path between the Silicon Photonics chip and the waveguide interconnect. In an embodiment, one laser, such as a distributed feedback (DFB) laser can be connected to multiple modulators if the one laser has enough power for each of the modulated channels.

U.S. Pat. No. 6,341,031 describes an optical pulse generator having a high order transfer function that comprises a first and a second nested interferometric modulator, each modulator comprising an optical input, an electrical input, a first arm, a second arm and an optical output. The second interferometric modulator is optically coupled into the second arm of the first interferometric modulator. The optical output of the first interferometric modulator generates pulses at a repetition rate that is proportional to a multiple of a frequency of an electrical signal applied to the electrical input of at least one of the first and second interferometric modulator and at a duty cycle that is inversely proportional to the order of the transfer function of the optical pulse generator. The multiple may be any integer equal to or greater than one.

U.S. Pat. No. 9,838,239 describes an apparatus comprising a first electrical driver configured to generate a first binary voltage signal according to first data, a second electrical driver configured to generate a second binary voltage signal according to second data, wherein the first data and the second data are different, and a first optical waveguide arm coupled to the first electrical driver and the second electrical driver, wherein the first optical waveguide arm is configured to shift a first phase of a first optical signal propagating along the first optical waveguide arm according to a first voltage difference between the first binary voltage signal and the second binary voltage signal to produce a first, multi-level phase-shifted optical signal.

U.S. Pat. No. 8,676,060 describes a quadrature amplitude modulation (QAM) signal generator, which can obtain optical signals such as QAM signals without handling multilevel electrical signals, and can be produced by using a plurality of parallel Mach-Zehnder modulators (MZMs), such as quadruplex parallel MZMs (QPMZM). The quadrature amplitude modulation (QAM) signal generator includes a first waveguide, a first quadrature phase-shift-keying (QPSK) signal generator provided on the first waveguide, a second waveguide connected with the first waveguide at a wave-combining point, and a second quadrature phase-shift-keying (QPSK) signal generator provided on the second waveguide.

SUMMARY OF THE INVENTION

An embodiment of the present invention provides a multi-chip module (MCM), including a substrate, one or more photonic chips, and an electronic chip. The one or more photonic chips are disposed on the substrate, each photonic chip including (a) one or more optical channels, which are configured to guide propagating optical signals, and (b) two or more photonic modulator-segments coupled to each of the optical channels, each photonic modulator-segment configured to modulate the propagating optical signals responsively to digitally modulated driving electrical signals provided thereto. The electronic chip, which is disposed on the substrate, is configured to (i) generate the digitally modulated driving electrical signals on multiple different lanes of the electronic chip, (ii) synchronize the driving electrical signals on the multiple lanes to a same clock, (iii) separately control respective phases of the driving electrical signals, (iv) fine-tune the voltages of the driving electrical signals on the multiple lanes, and (v) drive the photonic modulator-segments on the photonic chips with the synchronized and phase-controlled driving electrical signals.

In some embodiments, the two or more photonic modulator segments modulate the propagating optical signals responsively to the digitally modulated driving electrical signals so as to upscale a modulation format of electrical data to a higher-order modulation format for optical data.

In some embodiments, the two or more photonic modulator segments are coupled to the one or more optical channels in one or more of a cascade and a parallel arrangement.

In an embodiment, at least one of the one or more photonic chips includes a Mach-Zehnder modulator, and wherein the two or more photonic modulator segments are coupled on arms of the Mach-Zehnder modulator.

In another embodiment, the electronic chip is configured to digitally modulate the driving electrical signals to drive the two or more photonic modulator segments to generate one of optical pulse-amplitude modulation (OPAM) and optical quadrature amplitude modulation (OQAM).

In some embodiments, each optical channel includes an optical power monitor that is configured to measure a time-dependent average power of the modulated optical signals.

In some embodiments, the electronic chip is configured to separately control respective phases of the driving electrical signals by being initially calibrated using the optical power monitor.

In an embodiment, the electronic chip comprises an application-specific integrated circuit (ASIC).

In another embodiment, the optical signals have a same optical carrier frequency.

There is additionally provided, in accordance with an embodiment of the present invention, a method, including guiding propagating optical signals in one or more optical channels of one or more photonic chips disposed on a substrate of a multi-chip module (MCM). The propagating optical signals are modulated responsively to digitally modulated driving electrical signals, using two or more photonic modulator segments coupled to each of the optical channels. The digitally modulated driving electrical signals are generated on multiple different lanes of an electronic chip disposed on the substrate. The driving electrical signals are synchronized on the multiple lanes to a same clock. Respective phases of the driving electrical signals are separately controlled. The voltages of the driving electrical signals are fine-tuned on the multiple lanes. The photonic modulator segments on the photonic chips are driven with the synchronized and phase-controlled driving electrical signals.

There is further provided, in accordance with an embodiment of the present invention, a manufacturing method, including disposing on a substrate of a multi-chip module (MCM) one or more photonic chips, each photonic chip including (a) one or more optical channels, which are configured to guide propagating optical signals, and (b) two or more photonic modulator-segments coupled to each of the optical channels, each photonic modulator-segment configured to modulate the propagating optical signals responsively to digitally modulated driving electrical signals provided thereto. An electronic chip is disposed on the substrate, the electronic chip is configured to (i) generate the digitally modulated driving electrical signals on multiple different lanes of the electronic chip, (ii) synchronize the driving electrical signals on the multiple lanes to a same clock, (iii) separately control respective phases of the driving electrical signals, (iv) fine-tune the voltages of the driving electrical signals on the multiple lanes, and (v) drive the photonic modulator segments on the photonic chips with the synchronized and phase-controlled driving electrical signals.

There is furthermore provided, in accordance with an embodiment of the present invention, a multi-chip module (MCM) including a substrate, one or more electrical lanes, one or more electronic modulator chips, and an electronic chip. The one or more electrical lanes are disposed on the substrate and configured to carry electrical signals having a same carrier frequency. The one or more electronic modulator chips are coupled to each of the electrical lanes, and each electronic modulator chip configured to modulate the electrical signals responsively to digitally modulated driving electrical signals provided thereto. The electronic chip, which is disposed on the substrate, is configured to (i) generate the digitally modulated driving electrical signals on multiple different lanes of the electronic chip, (ii) synchronize the driving electrical signals on the multiple lanes to a same clock, (iii) separately control respective phases of the driving electrical signals, (iv) fine-tune the voltages of the driving electrical signals on the multiple lanes, (v) drive the electronic amplifier chips with the synchronized and phase-controlled driving electrical signals, and (vi) combine synchronized and phase-controlled amplified signals into a high order signal.

In some embodiments, the electronic chip is configured to digitally modulate the driving electrical signals and to combine the signals using one of pulse-amplitude modulation (PAM) and quadrature amplitude modulation (QAM).

The present invention will be more fully understood from the following detailed description of the embodiments thereof, taken together with the drawings in which:

DETAILED DESCRIPTION OF EMBODIMENTS

Overview

Ever-faster telecom switches are required in order to cope with increasing data traffic inside a data center. For example, current switches may be capable of handling 12.8 Tb/s of data traffic by employing an application-specific integrated circuit (ASIC) equipped with 256 data lanes, each operating at 50 Gb/s. Typically, data lanes from the ASIC are routed to multiple pluggable photonic transceiver modules. However, scalability of such pluggable modules has lately been questioned, because, for example, the number of available optical input/output (I/O) ports is limited by physical space. Thus, further upscaling of switch data traffic throughput, e.g., to 51.2 Tb/s and more, is expected to require new concepts relying on more compact integration of photonic transceivers with the ASIC switch. Concepts that involve co-packaging of the optics with the ASIC can overcome the size and power consumption challenge at the interface between the ASIC and optics. On the optics side, however, the challenge of managing a large number of optical I/Os persists.

One possible concept to enable more compact optical I/Os at the switch transceivers is to use wavelength division multiplexing (WDM) to increase data traffic throughput using a given and limited number of optical I/O ports. Although WDM is commonly used with photonic transceivers, for example in high-end long-haul communication networks, and is therefore a possible solution for the problem of handling increased traffic at a data center, WDM comes with a number of tradeoffs, such as increased complexity of the photonic circuits and methods of fabrication that are required in order to enable multiplexing multiple optical signals, each with a different wavelength (i.e., a different optical carrier frequency).

Embodiments of the present invention that are described hereinafter provide a multi-chip module (MCM)-based apparatus for directly multiplexing several electrical data lanes into a smaller number of optical lanes, where all optical lanes guide optical signals having the same wavelength (i.e., sharing the same optical carrier frequency). The multiplexing, and by so modulating the propagating optical signals responsively to digitally modulated driving electrical signals, is achieved by upscaling the modulation format of the electrical data to a higher-order modulation format for the optical data.

In some embodiments, the disclosed technique uses a host electronic circuit, such as an ASIC or a field-programmable gate array (FPGA), to digitally modulate two or more photonic modulator-segments that are coupled to a single optical output channel. The two or more photonic modulator-segments modulate the propagating optical signals responsively to the digitally modulated driving electrical signals, so as to upscale the modulation format of the electrical data to a higher-order modulation format for the optical data.

In an embodiment, each of the two or more photonic modulator-segments are realized in a photonic chiplet. Each MCM, such as each photonic chip, may therefore comprise multiple chiplets. In such photonic chips, the electro-optical circuitry is subdivided into such functional circuit blocks (i.e., the chiplets). In an embodiment, to further increase data rate, multiple optical channels may be integrated in a compact MCM-based apparatus, for example, by disposing multiple photonic chips, each comprising multiple photonic chiplets, on a single MCM substrate.

The host electronic circuit (e.g., ASIC) has several functionalities for providing low-voltage driving signals to the photonic chips without the need for driving electronics or signal conditioning electronics at the side of the photonic chip. The ASIC further performs functionalities, such as synchronizing the driving signals and tuning relative phases between the binary driving signals, which may otherwise require integration of additional electrical circuitry in proximity to the photonic chip, such as for clock and data recovery (CDR).

By multiplexing electrical signals using a number of $M \geq 2$ photonic modulator-segments on a single optical channel, data rate per optical channel can be increased by up to a factor M as compared with an architecture consisting of a single photonic modulator per optical channel. Correspondingly, the required number of optical channels can be lowered, and the complexity of the photonic chips reduced. Additionally or alternatively, using a number of M photonic modulator-segments on a single optical channel can lower the peak driving electrical voltage required by the disclosed ASIC by a factor up to M, for the same data rate per optical channel.

In some embodiments, the disclosed electronic chip is configured to digitally modulate the driving electrical signals to drive the two or more photonic modulator-segments to generate one of optical pulse-amplitude modulation (OPAM) and optical quadrature amplitude modulation (OQAM).

Figure 4A:
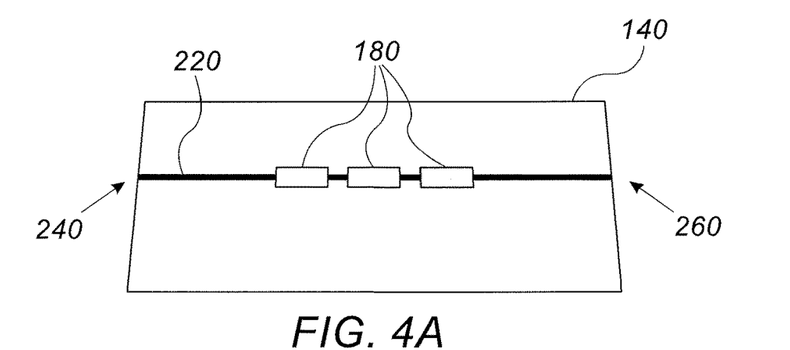
FIGS. 4A and 4B are block diagrams that schematically illustrate high-order architectures of photonic modulator-segments on a photonics chip in an MCM, in accordance with other embodiments of the present invention.
Figure 4B:
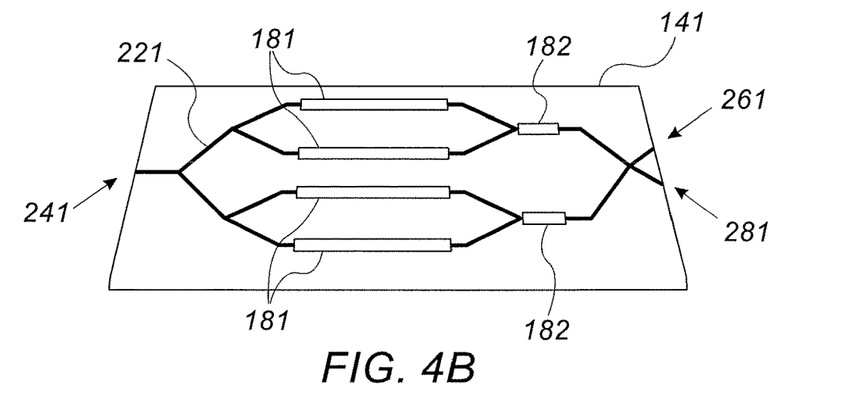

Manufacturing methods of the disclosed MCM-based apparatus are also disclosed. For example, in some embodiments, the photonic chip is connected to a host ASIC by means of short electrical links which carry the data of multiple electrical lanes. The photonic modulator-segments on the photonic chip are driven directly by the electronics on the ASIC, so that no additional electronics is required at the photonic chip side. The photonic chip hosts multi-segmented photonic modulators, consisting of multiple active segments in a cascaded or parallel (interferometric) arrangement, as shown in FIG. 4. Each segment (or group of segments) is driven by a separate electrical signal supplied by the ASIC.

As noted above, the disclosed technique multiplexes multiple electrical signals into a multi-level optical signal. The number of levels present in the optical signal depends on the number of electrical signals feeding the modulator segments, as well as on the number, and intensity, of levels present at each electrical signal. The high-order modulation may apply to the intensity of the optical carrier, to its phase, or both.

In some embodiments, an optical power monitor, such as a circuit comprising a photodiode, is used in order to measure the average power output of an optical signal. The monitor photodiode is a low-bandwidth detector connected to slow electronic circuitry for data acquisition and can be located at an unused port of the modulator, or in-line with its main output port, using, for example, a tap coupler.

The disclosed technique, in which (i) an ASIC on an MCM directly drives, at the same time, multiple photonic modulator-segments that are also on the MCM, and (ii) multiplexes several electrical data lanes into a single high-order data modulated optical channel, may provide the means for high data rate traffic without using complicated optics that increase the cost of a communication system.

MCM Architecture for ASIC and Photonic Chip

Figure 1:
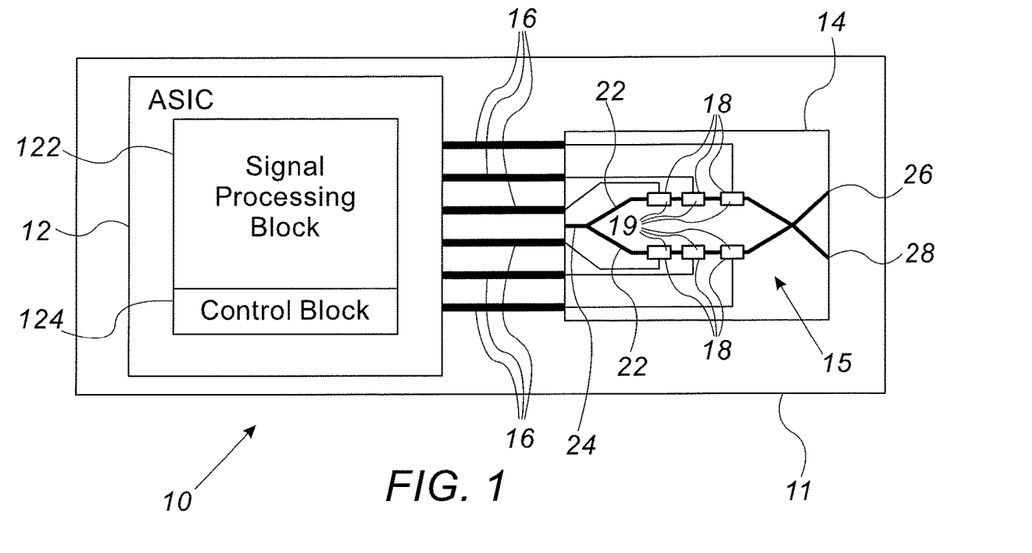
FIG. 1 is a block diagram that schematically illustrates a multi-chip module (MCM)-based apparatus for communication using digitally multiplexed photonic signals, in accordance with an embodiment of the present invention.

FIG. 1 is a block diagram that schematically illustrates a multi-chip module (MCM)-based apparatus 10 for communication using digitally multiplexed photonic signals, in accordance with an embodiment of the present invention. The disclosed embodiments exemplify applications in an MCM that reduce the number of optical I/Os. MCM-based apparatus 10 comprises a carrier 11 (e.g., a substrate) supporting an ASIC 12, a photonic chip 14, and a number of M short electrical lanes 16 having at their ends respective driving electrodes 19, where, by way of example, M=6 in FIG. 1, that conduct driving electrical signals from ASIC 12 to M respective photonic modulator-segments 18, which convert the M respective driving electrical signals into a single high-order modulated optical signal.

In an embodiment, the segments in the upper arm of the MZM and the segments in the lower arm are driven by the same data, e.g., in complementary pairs (i.e., first segment in the upper arm is driven by the complementary signal of that driving the first segment on the lower arm of the MZM). This facilitates the use of differential signaling for the lanes 16, and these lines are implemented in pairs (signal and its complement).

In the shown embodiment, the M=6 optical modulator-segments 18 are grouped into two sets, each of which is comprised of three photonic modulator-segments in tandem (i.e., cascaded), with the two sets placed in a parallel (interferometric) arrangement, on optical waveguide arms 22 of a Mach-Zander interferometer (MZI) 15, which has an optical input 24 and optical outputs 26 and 28. Typically, MZI 15 is configured so that one optical output is used for optical power monitoring, and the other optical output conveys the M/2-order modulated optical signal to another part of a communication system comprising MCM-based apparatus 10.

To process and control the electrical driving signals, ASIC 12 comprises a signal processing block 122 and signal control block 124. Signal processing block 122 of ASIC 12 synchronizes the electrical signals generated at different lanes of ASIC 12, so that they share the same clock. This ensures that the signals arriving at MZI 15 electrical inputs, such as signals 30a and 30b of FIG. 2, have a constant phase relation (which will be controlled by control block 124). The functionalities of block 124 are further described below.

The block diagram shown in FIG. 1 is brought by way of example. The number and arrangement of ASICs, photonic chips per ASIC chip, photonic modulator-segments per optical channel, and electrical and optical interconnects, may vary. For the sake of clarity, optical I/Os of photonic chip 14 are not depicted. In some embodiments, short electrical lanes 16 comprise a means for forming the electrical links, such as CEI-56G-USR, CEI-56G-VSR, or similar.

Figure 2:
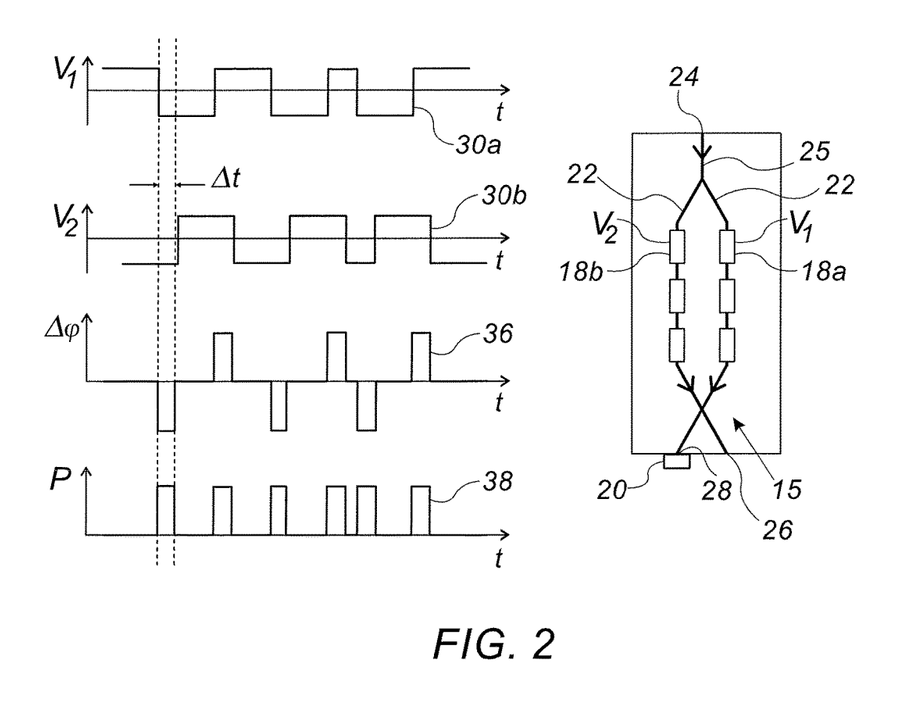
FIG. 2 is a graph that schematically illustrates a technique for digital multiplexing of multiple electronic signals into a photonic signal as performed by the MCM-based apparatus shown in FIG. 1, in accordance with an embodiment of the present invention.

Consolidating Multiple Electrical Data Signals into an Optical Data Signal on an MCM Using ASIC for Controlling a Photonics Transceiver FIG. 2 is a graph that schematically illustrates a technique for digital multiplexing of multiple electronic signals into a photonic signal as performed by the MCM-based apparatus shown in FIG. 1, in accordance with an embodiment of the present invention. An optical signal 25, typically received by coupling a continuous wave (CW) laser output into optical input 24, is split by the input splitter of the MZI 15 into two CW optical signals, each of which propagates in a respective optical waveguide arm 22 of MZI 15.

By way of example, each of the split CW optical signals is independently modulated by two of the six photonic modulator-segments on MZI 15, i.e., by 18a and 18b photonic modulator segments, which receive driving modulating electrical signals $V_1(t)$ and $V_2(t)$, respectively, from ASIC 12. Driving electrical signals $V_1$ and $V_2$ have square waveforms 30a and 30b, respectively. In FIG. 2, the signals have been amplitude-equalized by ASIC 12, by a step described in FIG. 3. Electrically tuning a timing difference $\Delta t$ between waveforms 30a and 30b (e.g., using signal processing block 124 of ASIC 12) generates a net phase shift 36 between the modulator's arms as a result of applying waveforms 30a and 30b.

In disclosed embodiments, in which ASIC 12 directly drives modulator-segments 18 via lanes 16, undesired fixed phase differences between signals, such as between $V_1(t)$ and $V_2(t)$ in FIG. 2, may arise, for example due to variability in length of electrical lanes 16. Control block 124 controls the waveform phase for each lane-generated signal on ASIC 12. This ensures that the signals arrive at the modulator-segments 18 in-phase, i.e. with zero-time skew. Specifically, during process of modulation initialization, control block 124 of ASIC 12 aligns phases of all driving signals to modulator-segments 18 on MZI 15, as shown in FIG. 2. Control block 124 separately controls respective phases of the driving electrical signals by being initially calibrated using optical power monitor 20.

In a separate initialization step, control block 124 sets and equalizes amplitudes of waveforms at a voltage fine-tuning step, as shown by modulating electrical signals $V_1(t)$ and $V_2(t)$ in FIG. 2.

In an embodiment, a method is provided to equalize the frequency response of the signals provided to the modulator driving electrodes 19 (shown in FIG. 1) of the different modulator-segments 18 by estimating the appropriate equalizer tap coefficients. If the optical signal measured by sensor 20 from an individual modulator-segment is sufficiently high, then each modulator-segment 18 is driven separately and individual tap coefficients are obtained for each modulator-segment by the ASIC. If, on the other hand, the optical signal generated from an individual modulator-segment is too low, the method modulates more than one of segments 18 with a single driving signal to obtain strong enough optical signal, and based on the optical signal, estimates the tap coefficients collectively, assuming they are all equal (i.e., the frequency response of the channels is equalized, from ASIC 12 to modulator-segments 18. If taps are assumed equal, then it is further assumed that the frequency response of all these channels is identical).

During the initialization process of ASIC 12, MZI 15 is biased at its null transmission point, meaning that modulator-segments 18 are biased such that MZI 15 outputs zero optical power from optical output 26, to which optical power sensor 20 is coupled, when there is a zero-phase shift 36 between split optical signals propagating in arms 22. As outputs 26 and 28 are complementary in terms of output power, this process ensures maximal power at MZI output port 28. Whenever waveforms 30a and 30b cause photonic modulator-segments 18a and 18b to produce a net phase shift difference 36 between split signals propagating in arms 22 of MZI 15, modulated optical power 38 is outputted (complementary) from optical outputs 26 and 28.

Optical power 38 is measured by a low-bandwidth optical power measurement circuit (not shown) comprising a photodiode 20 at output port 28. The complementary of optical power 38 is outputted from optical output 26 carried to other sections of a communication system optical data traffic generated by MCM-based apparatus 10.

Figure 3:
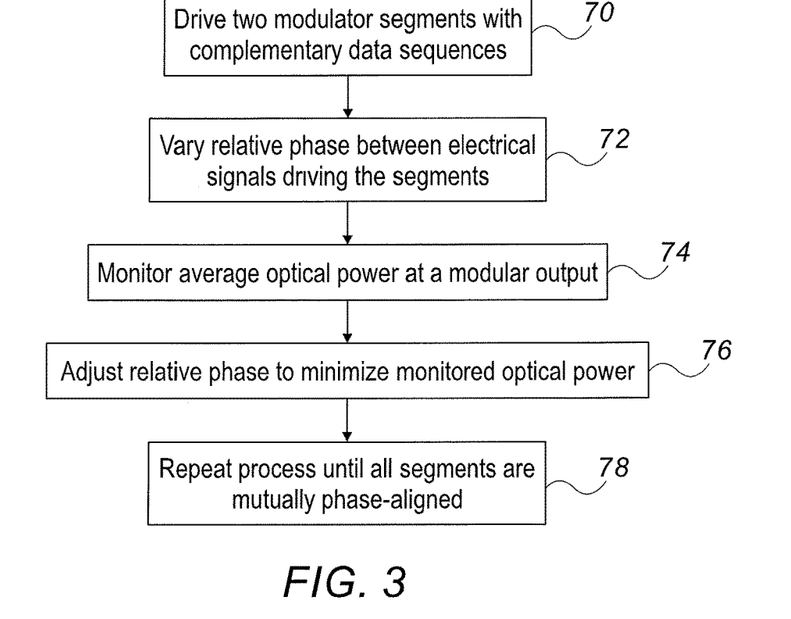
FIG. 3 is a flow chart that schematically illustrates an initialization process for the digital multiplexing of multiple electronic signals into a photonic signal, in accordance with an embodiment of the present invention.

FIG. 3 is a flow chart that schematically illustrates an initialization process for the digital multiplexing of multiple electronic signals into a photonic signal, in accordance with an embodiment of the present invention. The initialization process for aligning the phase of all signals driving the modulator-segments is essential, given that there is no retiming functionality at the photonic chip, therefore ASIC 12 needs to precisely tune the relative phase of its electrical outputs 16 so that the electrical signals arrive in-phase at the photonic modulator-segments 18 inputs.

The process, which is applicable to an interferometric architecture, such as that shown in FIG. 1, begins when ASIC 12 drives two segment modulator-segments 18a and 18b with complementary data sequences (e.g., two mutually orthogonal Golay complementary sequences of electrical driving signals), at a driving step 70. During step 70 the rest of the modulator-segments are open-circuited or grounded.

Next, ASIC 12 varies the relative phase between the electrical driving signals for modulator-segments 18a and 18b, at a phase variation step 72. Using signals received from optical power measurement circuitry, ASIC 12 monitors the resulting optical output power, at an optical output power monitoring step 74. ASIC 12 minimizes the optical power by adjusting the relative phase between the two electrical waveforms, at an adjusting relative phase step 76. Steps 70-76 are repeated for any photonic modulator-segments that has not yet been initialized, using an already initialized modulator segment, at a continued initialization step 78, until the entire MCM-based apparatus 10 is ready for operation.

The flow chart of FIG. 3 is brought by way of example. A related process is applicable, with the necessary changes being made to cascaded modulator-segments (shown in FIG. 5A), in which modulator-segments are driven with the same data sequence and the relative phase is fine-tuned until the monitored optical power is maximized. Furthermore, while in an interferometric scheme, the interferometer (e.g., MZI 15) is usually biased at its minimum transmission point using interferometric modulator-segments 18. In case of cascaded modulator-segments (e.g., configuration of FIG. 4A), photonic modulator-segments 18 are biased at their typical working point.

FIGS. 4A and 4B are block diagrams that schematically illustrate high-order architectures of photonic modulator-segments on a photonics chip in an MCM, in accordance with other embodiments of the present invention. FIG. 4A shows three photonic modulator-segments 180 cascaded on an optical channel 220 having an input 240 and an output 260. Such an arrangement over a photonic chip 140 can modulate the amplitude and/or phase of up to M=3 electrical signals to be multiplexed into a third-order modulated optical signal.

FIG. 4B shows six photonic modulator segments, with four photonic modulator-segments 181 fitted on arms of two inner MZIs, and together with modulator-segments 182 establish a sixth outer MZI modulator having arms 221, an input 241, and outputs 261a and 281. Segments 182 can be omitted for data generation and may be used only for proper biasing of the interferometer, As demonstrated by FIGS. 4A and 4B, different high-order modulation architectures can be employed, providing the same modulation order (e.g., M=3 of the parallel configuration architectures shown in FIG. 1 and FIG. 4B). The selection of a specific architecture would depend, for example, on compatibility requirements with other elements of the communication system.

Figure 5:
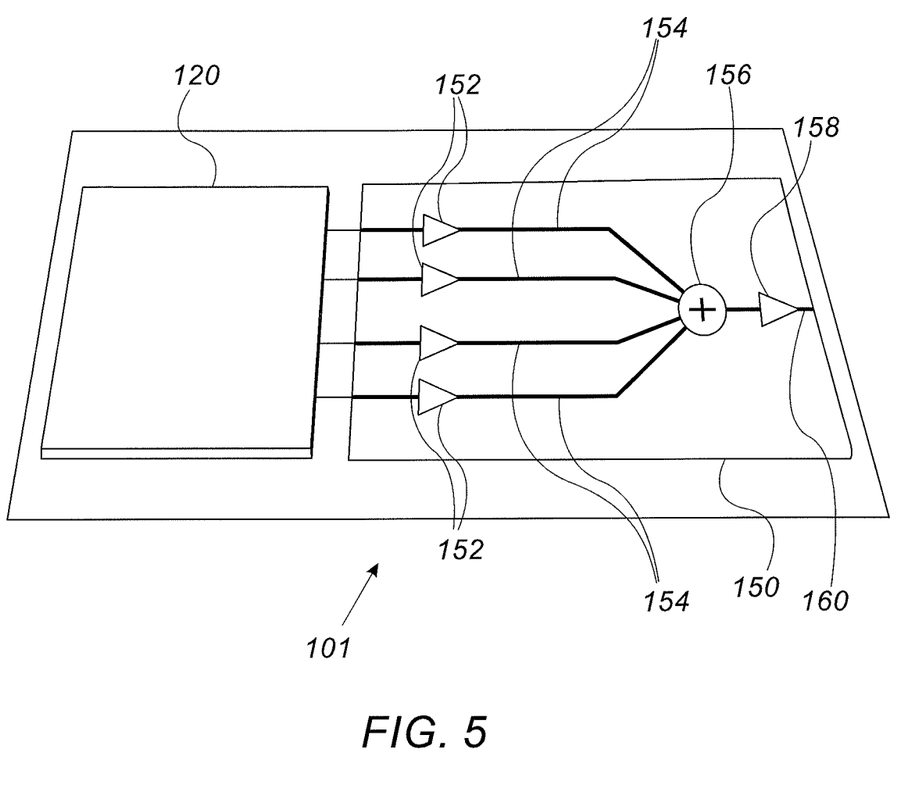
FIG. 5 is a block diagram that schematically illustrates an MCM-based apparatus for communication using digitally multiplexed electronic signals, in accordance with an embodiment of the present invention.

FIG. 5 is a block diagram that schematically illustrates an MCM-based apparatus 101 for a communication using digitally multiplexed electronic signals, in accordance with an embodiment of the present invention. As seen, an ASIC 120, which has similar properties to ASIC 12, independently drives four analog electrical amplifiers 152 disposed on an electrical chip 150. The gain of each amplifier is adjusted accordingly depending on the target modulation scheme. The four resulting modulated waveforms are multiplexed by a combiner 156 into an M=4 order modulated electrical signal. The M=4 order output signal of the disclosed fully electronic MCM-based apparatus 101 is amplified by an amplifier 158 and outputted to the system, or to network, via a single communication line 160.

Chiplets comprising amplifiers 152 are disposed on the MCM host analog electronic circuitry. The analog electronic transceiver chiplets are integrated on an MCM along with the ASIC following the same concept as described in FIG. 1 for a photonic MCM. The analog electronic circuitry is controlled by ASIC 120 such that no retiming, or other signal conditioning functionality, is performed on the transceiver chip. In this embodiment, the analog electronics on chip 150 may include elements such as voltage-controlled oscillators, RF mixers (e.g. configured as RF upconverters and downconverters), amplifiers, and passive components, e.g. substituting the combiner 156. The analog transceivers (e.g., amplifiers 152) are collectively and independently controlled by ASIC 120 which, mutatis mutandis, implements one or more of the new functionalities listed above for driving and controlling photonic chip 12.

In the embodiment shown in FIG. 5, the initialization process for synchronization is slightly modified (when compared with that described in FIG. 3) according to the exact layout of the analog electronic modulators. In case of a parallel structure, such as the implementation illustrated in FIG. 5, the initialization procedure thus follows the same rationale and is modified as follows:

Two modulator-segments are driven with complementary signals, whereas the rest of the segments are open-circuited, grounded or powered down.

The electrical signal power is adjusted so that the two segments have equal power.

The relative phase between the electrical signals driving the two segments is varied and the average power at the module's output is monitored. The relative phase is fixed at the point where the monitored electrical power is minimum.

Optionally, the voltages of the electrical signals driving the two segments are fine-tuned to further minimize the monitored electrical power.

The process is repeated between one of the phase-aligned segments and another segment that has not yet been aligned, until all segments are mutually phase-aligned.

The block diagram shown in FIG. 5 is brought by way of example. The number and arrangement of the various chips (e.g., ASIC 120 and modulator chip 150) may vary. Moreover, transceivers may be used in addition to, or as a replacement for, amplifiers 152, and combiner 158 may be used as a demultiplexer (i.e., signal splitter), to allow bi-directional communication via communication line 160.

Although the embodiments described herein mainly address integrated circuitries for transmitting and receiving optical and/or electrical signals at high rates for communication, the methods and systems described herein can also be used in other applications, such as in antenna phased arrays.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A multi-chip module (MCM), comprising :
   a substrate;
   one or more photonic chips disposed on the substrate, each photonic chip comprising:
      one or more optical channels, which are configured to guide propagating optical signals; and
      two or more photonic modulator-segments coupled to each of the optical channels, each photonic modulator-segment configured to modulate the propagating optical signals responsively to digitally modulated driving electrical signals provided thereto; and an electronic chip, which is disposed on the substrate and is configured to:
generate the digitally modulated driving electrical signals on multiple different lanes of the electronic chip;
synchronize the driving electrical signals on the multiple lanes to a same clock;
separately control respective phases of the driving electrical signals;
fine-tune the voltages of the driving electrical signals on the multiple lanes; and
drive the photonic modulator-segments on the photonic chips with the synchronized and phase-controlled driving electrical signals.

2. The MCM according to claim 1, wherein the two or more photonic modulator-segments modulate the propagating optical signals responsively to the digitally modulated driving electrical signals so as to upscale a modulation format of electrical data to a higher-order modulation format for optical data.

3. The MCM according to claim 1, wherein the two or more photonic modulator-segments are coupled to the one or more optical channels in one or more of a cascade and a parallel arrangement.

4. The MCM according to claim 1, wherein at least one of the one or more photonic chips comprises a Mach-Zehnder modulator, and wherein the two or more photonic modulator-segments are coupled on arms of the Mach-Zehnder modulator.

5. The MCM according to claim 1, wherein the electronic chip is configured to digitally modulate the driving electrical signals to drive the two or more photonic modulator-segments to generate one of optical pulse-amplitude modulation (OPAM) and optical quadrature amplitude modulation (OQAM).

6. The MCM according to claim 1, wherein each optical channel comprises an optical power monitor that is configured to measure a time-dependent average power of the modulated optical signals.

7. The MCM according to claim 6, wherein the electronic chip is configured to seperately control respective phases of the driving electrical signals by being initially calibrated using the optical power monitor.

8. The MCM according to claim 1, wherein the electronic chip comprises an application-specific integrated circuit (ASIC) .

9. The MCM according to claim 1, wherein the optical signals have a same optical carrier frequency.

10. A method, comprising:
guiding propagating optical signals in one or more optical channels of one or more photonic chips disposed on a substrate of a multi-chip module (MCM) ;
modulating the propagating optical signals responsively to digitally modulated driving electrical signals, using two or more photonic modulator-segments coupled to each of the optical channels;
generating the digitally modulated driving electrical signals on multiple different lanes of an electronic chip disposed on the substrate;
synchronizing the driving electrical signals on the multiple lanes to a same clock;
separately controlling respective phases of the driving electrical signals;
fine-tuning the voltages of the driving electrical signals on the multiple lanes; and
driving the photonic modulator-segments on the photonic chips with the synchronized and phase-controlled driving electrical signals.

11. The method according to claim 10, wherein modulating the propagating optical signals responsively to the digitally modulated driving electrical signals comprises upscaling a modulation format of electrical data to a higher-order modulation format for optical data.

12. The method according to claim 10 wherein the two or more photonic modulator-segments are coupled to the one or more optical channels in one or more of a cascade and a parallel arrangement.

13. The method according to claim 10, wherein modulating the propagating optical signals comprises applying one of optical pulse-amplitude modulation (OPAM) and optical quadrature amplitude modulation (OQAM).

14. The method according to claim 10, wherein the electronic chip comprises an application-specific integrated circuit (ASIC).

15. The method according to claim 10, wherein the optical signals have a same optical carrier frequency.

16. A manufacturing method comprising:
disposing on a substrate of a multi-chip module (MCM) one or more photonic chips, each photonic chip comprising:
one or more optical channels, which are configured to guide propagating optical signals; and
two or more photonic modulator-segments coupled to each of the optical channels, each photonic modulator-segment configured to modulate the propagating optical signals responsively to digitally modulated driving electrical signals provided thereto; and
disposing on the substrate an electronic chip, which is configured to:
generate the digitally modulated driving electrical signals on multiple different lanes of the electronic chip;
synchronize the driving electrical signals on the multiple lanes to a same clock;
separately control respective phases of the driving electrical signals;
fine-tune the voltages of the driving electrical signals on the multiple lanes; and
drive the photonic modulator-segments on the photonic chips with the synchronized and phase-controlled driving electrical signals.

17. The MCM according to claim 16, wherein the electronic chip comprises an application-specific integrated circuit (ASIC) .

18. A multi-chip module (MCM), comprising:
a substrate;
one or more electrical lanes, disposed on the substrate and configured to carry electrical signals having a same carrier frequency;
one or more electronic modulator chips coupled to each of the electrical lanes, each electronic modulator chip configured to modulate the electrical signals responsively to digitally modulated driving electrical signals provided thereto; and
an electronic chip, which is disposed on the substrate and is configured to:
generate the digitally modulated driving electrical signals on multiple different lanes of the electronic chip;
synchronize the driving electrical signals on the multiple lanes to a same clock;
separately control respective phases of the driving electrical signals;

fine-tuning the voltages of the driving electrical signals on the multiple lanes;

drive the electronic amplifier chips with the synchronized and phase-controlled driving electrical signals; and combine synchronized and phase-controlled amplified signals into a high order signal.

19. The MCM according to claim 18, wherein the electronic chip is configured to digitally modulate the driving electrical signals and to combine the signals using one of pulse-amplitude modulation (PAM) and quadrature amplitude modulation (QAM).

* * * * *